US012141316B2

(12) United States Patent
Ramadhane et al.

(10) Patent No.: US 12,141,316 B2
(45) Date of Patent: Nov. 12, 2024

(54) OBFUSCATION OF SENSITIVE INFORMATION THROUGH NON-VISUAL FEEDBACK

(71) Applicant: International Business Machines Corporation, Armonk, NY (US)

(72) Inventors: Mohamed Zouhaier Ramadhane, Azcapotzalco (MX); Jose Luis Rodriguez Gomez, Mexico City (MX); Cesar Augusto Rodriguez Bravo, Alajuela (CR); Susanna Ting, Markham (CA); Ana Paola Hentze Veerkamp, Miguel Hidalgo (MX)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 17/450,542

(22) Filed: Oct. 11, 2021

(65) Prior Publication Data
US 2023/0116384 A1   Apr. 13, 2023

(51) Int. Cl.
*G06F 21/00* (2013.01)
*G06F 21/31* (2013.01)
*G06F 21/62* (2013.01)

(52) U.S. Cl.
CPC .......... *G06F 21/6245* (2013.01); *G06F 21/31* (2013.01)

(58) Field of Classification Search
CPC ...... G06F 21/6245; G06F 21/31; G06F 21/36; G06F 21/46; G06F 2221/031;
(Continued)

(56) References Cited

U.S. PATENT DOCUMENTS 6,209,104 B1   3/2001   Jalili
7,073,067 B2   7/2006   Mizrah
(Continued)

FOREIGN PATENT DOCUMENTS

CN   102982269 A   3/2013
EP   1708110 A1   10/2006
(Continued)

OTHER PUBLICATIONS

"10 Facts About Passwords to See Before You Make Another One", ID Agent, Jul. 13, 2020, 5 pgs., <https://www.idagent.com/blog/10-facts-about-passwords-that-you-need-to-see-now/>.
(Continued)

*Primary Examiner* — Yogesh Paliwal
(74) *Attorney, Agent, or Firm* — Aaron N. Pontikos

(57) ABSTRACT

In an approach to obfuscation of sensitive information through non-visual feedback, responsive to receiving a signal from a user to start a session requiring input of sensitive data, one or more dummy character positions are determined, where the one or more dummy character positions represent characters that are not part of the sensitive data. Responsive to a current character position is any dummy character position of the one or more dummy character positions, the user is signaled that a next input character will be ignored, where the user is signaled using non-visual feedback. Responsive to receiving the next input character from the user, where the current character position is any dummy character position of the one or more dummy character positions, the next input character is ignored.

9 Claims, 7 Drawing Sheets

(58) Field of Classification Search
CPC .. H04L 9/3226; H04L 9/3228; H04L 63/0838; H04L 63/0846

See application file for complete search history.

(56) References Cited

U.S. PATENT DOCUMENTS

| | | | |
|---|---|---|---|
| 8,347,103 | B2 | 1/2013 | Jones et al. |
| 8,749,361 | B2 | 6/2014 | Najafi |
| 8,756,672 | B1 | 6/2014 | Allen et al. |
| 8,826,028 | B1 | 9/2014 | Boyington |
| 8,968,103 | B2 | 3/2015 | Zhou |
| 9,030,293 | B1 | 5/2015 | Tabak |
| 9,552,465 | B2 | 1/2017 | Pike |
| 9,590,808 | B2 | 3/2017 | Jiang |
| 9,724,042 | B1 | 8/2017 | Lodato et al. |
| 10,025,952 | B1 | 7/2018 | Wang |
| 10,440,007 | B1 | 10/2019 | Ramalingam et al. |
| 11,556,628 | B2 | 1/2023 | Marzorati et al. |
| 2004/0139331 | A1 | 7/2004 | Sanai et al. |
| 2007/0245150 | A1* | 10/2007 | Lu .................. G06F 21/34 713/184 |
| 2008/0034428 | A1 | 2/2008 | Bejar et al. |
| 2008/0209526 | A1 | 8/2008 | Varghese et al. |
| 2008/0235788 | A1 | 9/2008 | El Saddik |
| 2008/0290985 | A1 | 11/2008 | Vogedes et al. |
| 2009/0083847 | A1 | 3/2009 | Fadell et al. |
| 2009/0254954 | A1 | 10/2009 | Jeong |
| 2010/0218249 | A1 | 8/2010 | Wilson et al. |
| 2010/0319057 | A1 | 12/2010 | Murai et al. |
| 2013/0023240 | A1 | 1/2013 | Weiner |
| 2013/0127725 | A1* | 5/2013 | Sugimoto ............ G06F 3/02 345/168 |
| 2013/0291096 | A1 | 10/2013 | Finnan et al. |
| 2014/0018038 | A1 | 1/2014 | Bell et al. |
| 2014/0020087 | A1 | 1/2014 | Ooi |
| 2014/0118267 | A1 | 5/2014 | Thomas |
| 2014/0157424 | A1 | 6/2014 | Lee et al. |
| 2014/0317724 | A1 | 10/2014 | Hicks et al. |
| 2014/0359300 | A1* | 12/2014 | Shirakawa .......... G06F 21/36 726/5 |
| 2015/0045000 | A1 | 2/2015 | Kim et al. |
| 2015/0113666 | A1 | 4/2015 | Buck |
| 2015/0121493 | A1 | 4/2015 | Chen et al. |
| 2015/0235018 | A1 | 8/2015 | Gupta et al. |
| 2015/0248162 | A1 | 9/2015 | Masson |
| 2015/0319153 | A1 | 11/2015 | Tartz et al. |
| 2015/0355776 | A1 | 12/2015 | Govindarajeswaran |
| 2016/0182502 | A1 | 6/2016 | Smith et al. |
| 2016/0217293 | A1 | 7/2016 | Farkash |
| 2016/0283013 | A1 | 9/2016 | Engstrom et al. |
| 2016/0283710 | A1 | 9/2016 | Kwon et al. |
| 2017/0034158 | A1 | 2/2017 | Ekambaram et al. |
| 2017/0140169 | A1 | 5/2017 | Boger et al. |
| 2017/0329953 | A1 | 11/2017 | Defazio et al. |
| 2018/0089404 | A1* | 3/2018 | Uchida ............... G06F 3/0488 |
| 2018/0089405 | A1* | 3/2018 | Onishi ................ G06F 21/84 |
| 2018/0114003 | A1* | 4/2018 | Uenishi .............. G06F 3/04883 |
| 2018/0224989 | A1* | 8/2018 | Deasy ................ G06F 3/0233 |
| 2018/0253176 | A1 | 9/2018 | Hajimusa et al. |
| 2019/0050545 | A1 | 2/2019 | Keret et al. |
| 2019/0172468 | A1 | 6/2019 | Jain et al. |
| 2019/0213306 | A1 | 7/2019 | Caselles et al. |
| 2019/0236258 | A1 | 8/2019 | Mooney |
| 2020/0228641 | A1 | 7/2020 | Chen et al. |
| 2020/0349250 | A1 | 11/2020 | Marzorati |
| 2020/0356264 | A1 | 11/2020 | Cutler |
| 2021/0303737 | A1 | 9/2021 | Choudhari et al. |

FOREIGN PATENT DOCUMENTS

| | | |
|---|---|---|
| EP | 2254071 A1 | 11/2010 |
| JP | 2015-534658 A | 12/2015 |
| KR | 10-2015-0060674 A | 6/2015 |
| WO | 2014197791 A1 | 12/2014 |

OTHER PUBLICATIONS

"EC-Council, Hackers are here. Where are you?", Downloaded from the Internet on Aug. 9, 2021, 5 pgs., <https://www.eccouncil.org/>.

"HP Laptops Found to Have Hidden Keylogger", BBC News, Dec. 11, 2017, 7 pgs., <https://www.bbc.com/news/technology-42309371>.

"Ten people Have Been Charged in Keylogging Attacks that Caused $100 million in Financial Losses", Advanced Cyber Security Corp., Aug. 30, 2019, 2 pgs., <https://www.advancedcybersecurity.com/post/ten-people-have-been-charged-in-keylogging-attacks-that-caused-100-million-in-financial-losses>.

Alesand, et al., "A Shoulder Surfing Resistant Graphical Password System", Bachelor Thesis, Linköping University, Department of Computer Science, Information Technology, 2017, 41 pgs.

Bianchi, et al., "The Secure Haptic Keypad: A Tactile Password System", CHI 2010, Apr. 10-15, 2010, 5 pgs., Atlanta, Georgia, USA.

Disclosed Anonymously, et al., "Application-Driven Method to Obfuscate Sensitive Data Submission to Avoid Keylogging", IP.com Prior Art Database Technical Disclosure, IP.com No. IPCOM000209803D, Aug. 16, 2011, 4 pgs.

Disclosed Anonymously, et al., "Method and System for Providing Protection Against Shoulder Surfing in an Electronic Device", IP.com Prior Art Database Technical Disclosure, IP.com No. IPCOM000237121D, Jun. 4, 2014, 2 pgs.

Ho, et al., "Preventing Shoulder-Surfing Attack with the Concept of Concealing the Password Objects' Information", Hindawi Publishing Corporation, The Scientific World Journal, vol. 2014, Article ID 838623, May 27, 2014, 13 pgs., <http://dx.doi.org/10.1155/2014/838623>.

Lakshmanan, R., "New Android Malware Steals Banking Passwords, Private Data and Keystrokes", The Hacker News, Apr. 30, 2020, 5 pgs., <https://thehackernews.com/2020/04/android-banking-keylogger.html>.

Lexington Law, "How Shoulder Surfing Threatens Your Security", Apr. 30, 2021, 8 pgs., <https://www.lexingtonlaw.com/blog/negative-items/shoulder-surfing.html>.

Sobers, R., "134 Cybersecurity Statistics and Trends for 2021", Data Security, Inside Out Security Blog, Updated on Mar. 16, 2021, Downloaded from the Internet on Aug. 9, 2021, 26 pgs., <https://www.varonis.com/blog/cybersecurity-statistics/>.

Swinhoe, D., "What is a Man-in-the-Middle Attack? How MitM Attacks Work and How to Prevent Them", CSO, Feb. 13, 2019, 9 pgs., <https://www.csoonline.com/article/3340117/what-is-a-man-in-the-middle-attack-how-mitm-attacks-work-and-how-to-prevent-them.html>.

"Cybersecurity Services", Security Consulting and Management | IBM, 15 pps., printed from the Internet on Mar. 6, 2024, <https://www.ibm.com/security/services/threat-intelligence>.

"10 Best Password Managers of 2019", consumersadvocate.org, Feb. 9, 2019, 4 pages, https://www.onsumersadvocate.org/password-manager/a/best-password-manager?&pd=true&keyword=password&gca_campaignid=958851270&gcaadgroupid=50782975143&gca_matchtype=p&gcanetwork=g&gca_device=c&gca_adposition=101&gca_loc_interest_ms=&gca_loc_physical_ms=9009718&gclid=EAlalQobChMI3K2y8ZG53AIVA4ppCh12Ng9CEAMYASAAEgJCWPD_Bw.

"6 Ways to Unlock Pattern Lock on Android Easily", dr.fone, Copyright© 2019 Wondershare, printed from the Internet on Feb. 12, 2019, 18 pages, https://drfone.wondershare.com/unlock/pattern-lock.htm.

"Use a passcode with your iPhone, iPad, or iPod touch", Copyright© 2019 Apple Inc., Sep. 17, 2018, 4 pages, https://support.apple.com/en-US/HT204060.

Azad et al. "VAP code: A Secure Graphical Password for Smart Devices", Computers & Electrical Engineering, Apr. 2017, pp. 99-109 (13 pages), vol. 59, https://doi.org/10.1016/j.compeleceng.2016.12.007.

(56) References Cited

OTHER PUBLICATIONS

Dunn, Could semantic icons replace passwords and PINs?, Mobile, Privacy, Security threats, Jul. 18, 2018, 15 pages, https://nakedsecurity.sophos.com/2018/07 /18/could-semantic-icons-replace-passwords-and-pins/.

Spector, Windows 10 picture password: Draw your own conclusions about its safety, PC World from IDG, Mar. 14, 2016, 6 pages, https://www_pcworld.com/article/3035032/windows/windows-10-picture-password-draw-your-own-conclusions-about-its-safety.html.

* cited by examiner

OBFUSCATION OF SENSITIVE INFORMATION THROUGH NON-VISUAL FEEDBACK

BACKGROUND

The present invention relates generally to the field of cryptographic mechanisms for secure communication, and more particularly to obfuscation of sensitive information through non-visual feedback.

A password, sometimes called a passcode, is a form of sensitive information, typically a string of characters, usually used to confirm a user's identity. Passwords provide the first line of defense against unauthorized access to computing devices and personal information. In general, a password is an arbitrary string of characters including letters, digits, or other symbols. If the permissible characters are constrained to be numeric, the corresponding secret is sometimes called a personal identification number (PIN).

Shoulder surfing is a type of data theft where cybercriminals steal sensitive information by peering over the target's shoulders. A man-in-the-middle (MitM) attack is when an attacker intercepts communications between two parties either to secretly eavesdrop or modify traffic traveling between the two. Attackers might use MitM attacks to steal login credentials or personal information, spy on the victim, or sabotage communications or corrupt data.

A one-time password (OTP) is a password that is valid for only one login session or transaction, on a computer system or other digital device. OTPs are based on algorithms that create a new and random code each time that a password is requested. OTPs avoid several shortcomings that are associated with traditional (static) password-based authentication. An OTP is also known as a one-time PIN, one-time authorization code (OTAC) or dynamic password. The most important advantage addressed by OTPs is that, in contrast to static passwords, they are not vulnerable to replay attacks. This means that a potential intruder who manages to record an OTP that was already used to log into a service or to conduct a transaction will not be able to use it, since it will no longer be valid.

The current state of art has limitations. Visual login using a picture password, for example, is an improvement but still has weaknesses, including the user experience, limited picture choices, pictures are easier to remember for shoulder surfing, and all existing users need to re-enroll (to change the password into images). In addition, picture passwords cannot be implemented everywhere, e.g., in Interactive Voice Response (IVR). Another current alternative is a password manager. This is a safer alternative as it stores all passwords in a vault that is encrypted, but the limitations of a password manager include that all sensitive data is stored in one place, which can even be remote, such as a cloud-based password manager; password managers can be hacked if the user device is infected with malware; and password managers cannot protect against digital threats like man-in-the-middle attacks, network sniffing, spoofing attacks, etc.

SUMMARY

Embodiments of the present invention disclose a method, a computer program product, and a system for obfuscation of sensitive information through non-visual feedback. In one embodiment, responsive to receiving a signal from a user to start a session requiring input of sensitive data, one or more dummy character positions are determined, where the one or more dummy character positions represent characters that are not part of the sensitive data. Responsive to a current character position is any dummy character position of the one or more dummy character positions, the user is signaled that a next input character will be ignored, where the user is signaled using non-visual feedback. Responsive to receiving the next input character from the user, where the current character position is any dummy character position of the one or more dummy character positions, the next input character is ignored. Embodiments of the present invention insert dummy characters into an input of sensitive data to obfuscate the sensitive data from an attacker.

In one embodiment, responsive to receiving the next input character from the user, where the current character position is any dummy character position of the one or more dummy character positions, the next input character is ignored. Responsive to receiving the next input character from the user, where the current character position is not any dummy character position, the next input character is added to an input value string. Embodiments of the present invention ignore dummy characters to assemble the actual sensitive information.

In one embodiment, responsive to the next input character from the user being at least one of a same character as a last character input by the user and a next valid character of the sensitive data, the next input character is ignored. The user is signaled that the next input character will be ignored, where the user is signaled using the non-visual feedback. Embodiments of the present invention prevent the user from typing the same character repeatedly, or the next character of the actual sensitive information, to teach the user good practices.

In one embodiment, responsive to receiving a signal from a user to start a session requiring input of sensitive data, an OTP is generated. One or more dummy character positions are determined based on the OTP, where the one or more dummy character positions represent characters that are not part of the sensitive data. Responsive to a current character position is any dummy character position of the one or more dummy character positions, the user is signaled that a next input character will be ignored, where the user is signaled using non-visual feedback. The next input character is added to an input value string. Embodiments of the present invention use an OTP to insert dummy characters into an input of sensitive data to obfuscate the sensitive data from an attacker.

In one embodiment, responsive to receiving an indication that a last character of the input value string has been input by the user, the input value string is sent to a backend system, where the backend system extracts the sensitive data using a same OTP. Embodiments of the present invention use an OTP in a backend system to remove the dummy characters that were inserted into the input value string to extract the sensitive data.

DETAILED DESCRIPTION

Figure 1:
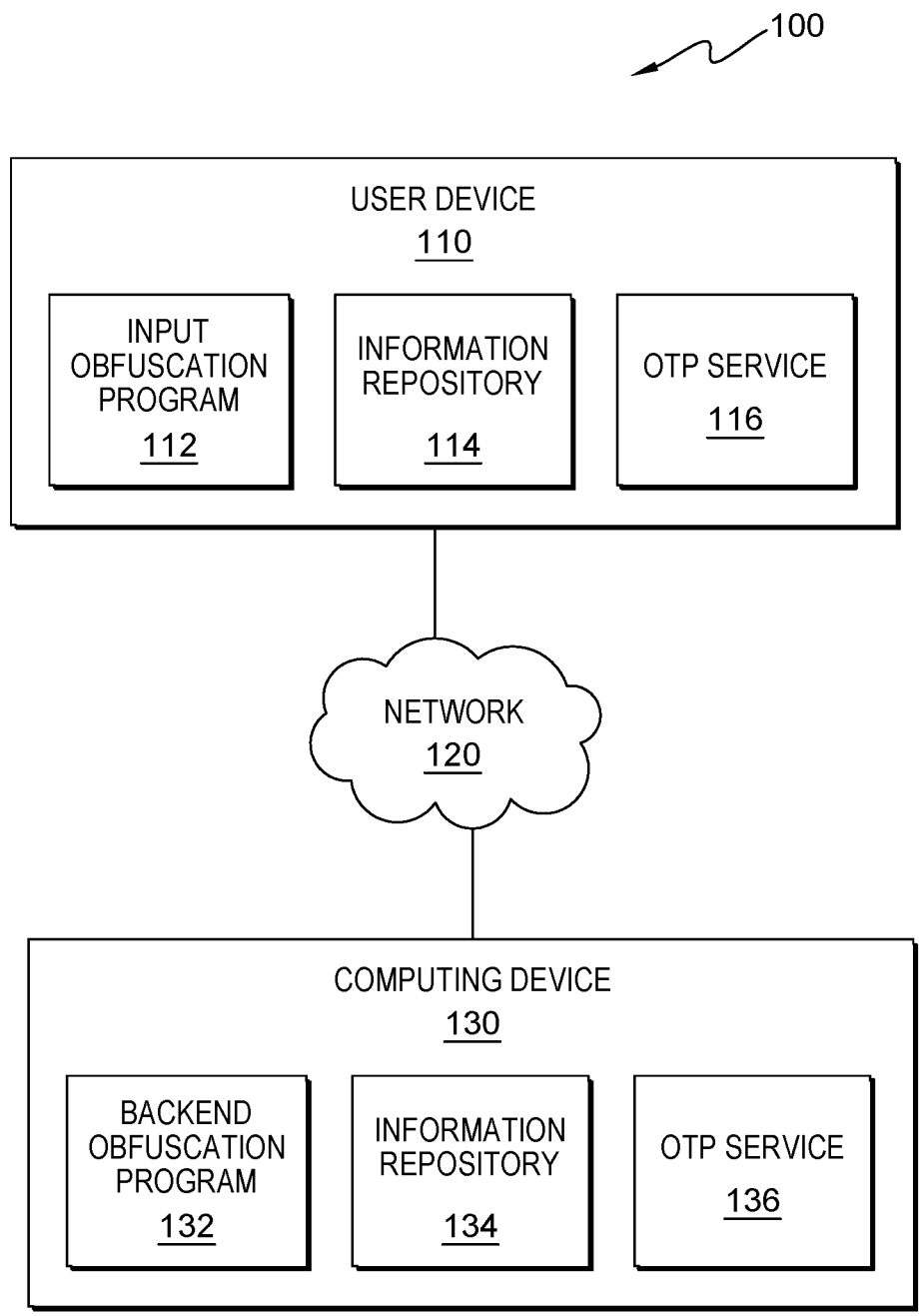
FIG. 1 is a functional block diagram illustrating a distributed data processing environment, in accordance with an embodiment of the present invention.

People live and work in an increasingly digital-centric world, where theft of sensitive information, such as passwords, is a common occurrence. It is often the precursor to much more serious crimes like identity theft and fraud. Password security statistics show that a majority of people reuse passwords across multiple sites, many people use the same password for all secure accounts and devices, and an overwhelming majority of data breaches are caused by password compromise. Unfortunately, nearly half of workers use the same passwords in both their personal and work accounts. Compromised passwords are responsible for most hacking-related breaches, and passwords were leaked in about two-thirds of recent breaches.

Currently the most common thefts of sensitive information are due to keyloggers, shoulder surfing, and other digital threats, such as MitM attacks, network sniffing, spoofing attacks, etc. Keyloggers are personal data leaks due to poor software practice and the rising popularity of virtual keyboard applications. The keylogger inserts itself into a device to receive keystrokes from the keyboard driver that pass to the operating system.

Shoulder surfing is a type of data theft where cybercriminals steal sensitive information by peering over the target's shoulders. Shoulder surfing can happen anywhere, as long as a keypad or touchscreen is used to send sensitive information. Historically kiosks and ATMs were the more common target locations, but with the pervasive use of smart phones or tablets to enter personal data these devices are increasingly vulnerable. Shoulder surfers can easily be found in places like restaurants, shopping malls, buses, trains, internet cafes, or ticket lines. In addition, pervasive use of high-definition security cameras allow attackers to easily capture keystrokes of a user to steal sensitive information.

Other digital threats include MitM attacks, network sniffing attacks, and spoofing attacks. An MitM attack is when an attacker intercepts communications between two parties either to secretly eavesdrop or modify traffic traveling between the two. Attackers might use MitM attacks to steal login credentials or personal information, spy on the victim, sabotage communications, or corrupt data.

MitM attacks can be achieved by using or combining multiple techniques including ARP spoofing, DNS Spoofing, sniffing attacks, SSL attacks (more specifically SSL and SSHv1), and Certificate Authority attacks. ARP spoofing is where an attacker inundates a local area network with falsified Address Resolution Protocol (ARP) packets in order to tamper with the normal traffic routing process. DNS spoofing is where corrupt Domain Name System (DNS) data is introduced into the DNS resolver's cache, causing the name server to return an incorrect result which results in traffic being diverted to the attacker's computer.

Network sniffing is a process of monitoring and capturing all data packets passing through a given network. Sniffers are legitimately used by network/system administrators to monitor and troubleshoot network traffic. Attackers, however, use sniffers to capture data packets containing sensitive information such as passwords, account information, etc. In SSL attacks a fake SSL server is inserted between a client and a server. The fake SSL server intercepts the handshake from the client, completes the handshake with the server, and then all communications between the client and the server go through the attacker. Certificate Authority attacks result in fake certificates being issued, giving the attacker full access to the certificate user's data. A spoofing attack is a situation in which a person or program successfully identifies as another by falsifying data, to gain an illegitimate advantage.

Existing solutions generally have drawbacks. Visual login using a picture password is an improvement but still has weaknesses, including the user experience, limited picture choices, pictures are easier to remember for shoulder surfing, and picture passwords cannot be implemented everywhere, e.g., IVR. A password manager is a safer alternative as it stores all passwords in a vault that is encrypted. But the risks of a password manager include all sensitive data is stored in one place, which can even be remote, such as a cloud-based password manager; password managers can be hacked if the user device is infected with malware; and password managers cannot protect against digital threats like man-in-the-middle attacks, network sniffing, spoofing attacks, etc.

The present invention is a computer-implemented method, computer program product, and system for sensitive information obfuscation through non-visual feedback. The present invention leverages non-visual device capabilities, e.g., haptic vibration, to enhance security during authentication. When a user introduces credentials, such as a password, in a device, e.g., a smart phone or tablet, the device will randomly leverage this capability to inform the user through non-visual feedback that the next character typed will be ignored. As the user enters each character of the sensitive information, the present invention will randomly signal the user through non-visual feedback that the next character input by the user will be a dummy character that is ignored by the system. When the user receives this feedback, the user will type a random character, which is ignored by the recipient system, but any attacker intercepting the character input will think this is part of the actual sensitive information. When the user has completed input of the sensitive information, the attacker will have an incorrect version of the information.

Figure 2A:
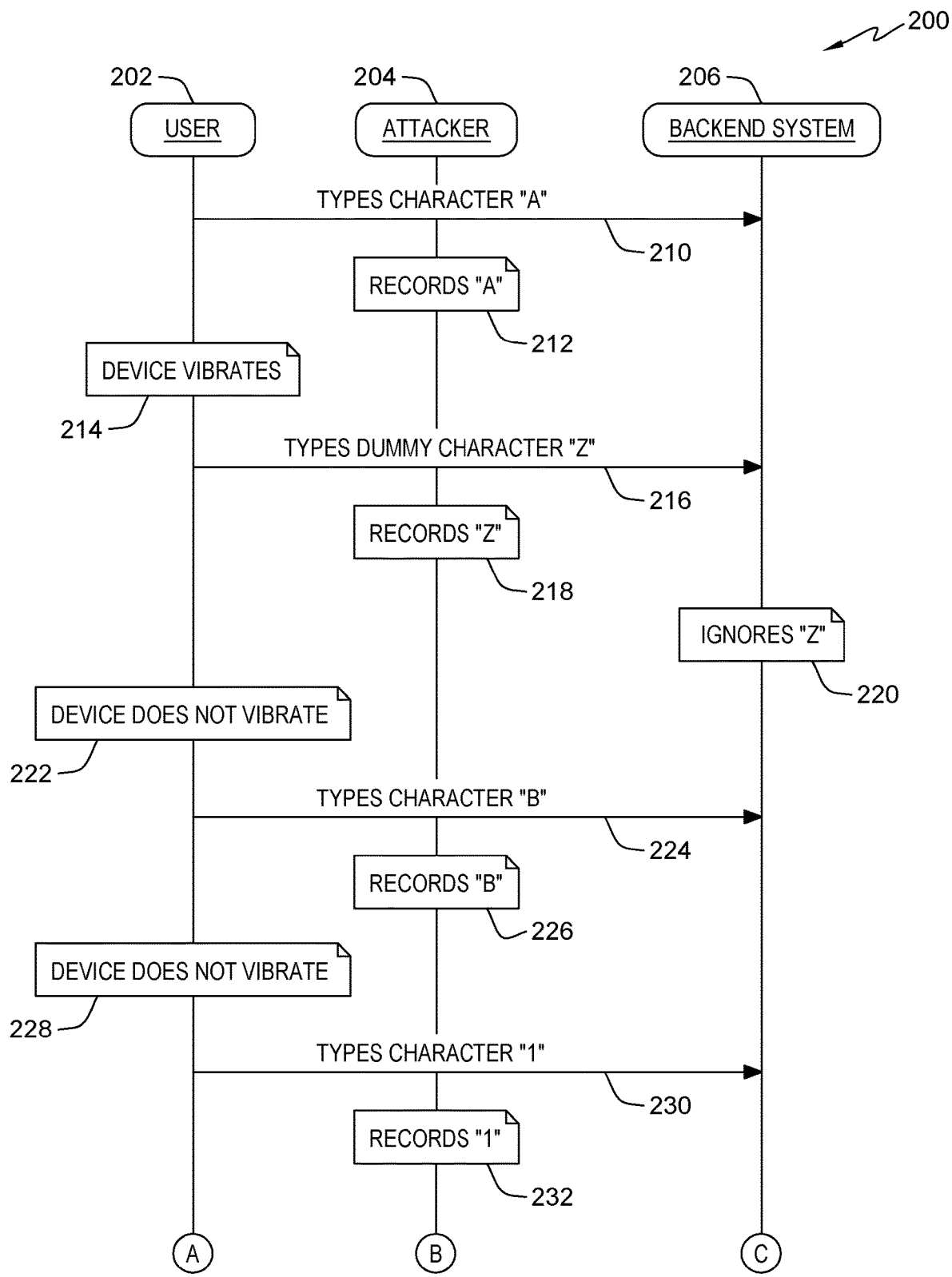
FIG. 2A and FIG. 2B are a sequence diagram illustrating an example of a user sending sensitive information to a backend system, in accordance with an embodiment of the present invention.
Figure 2B:
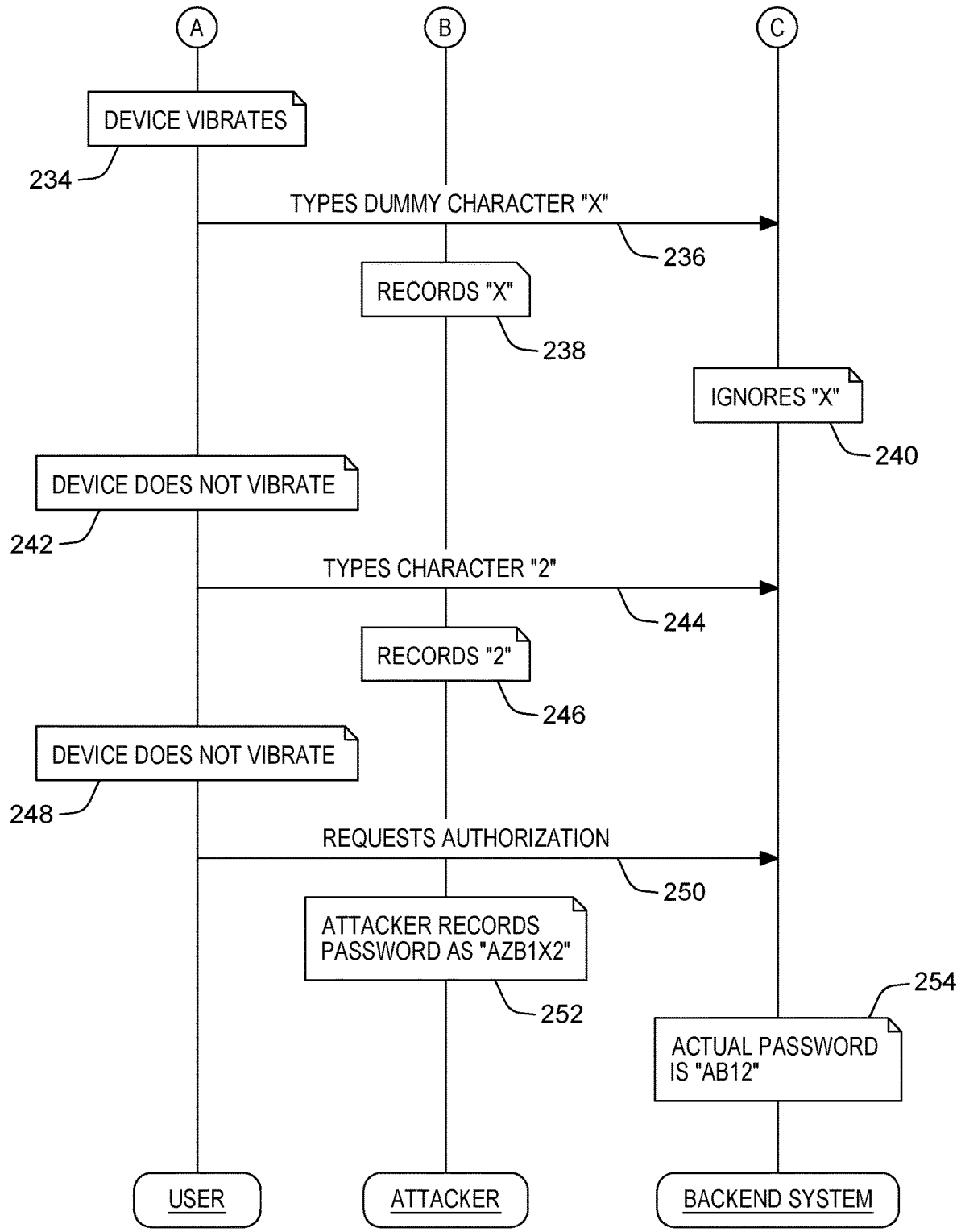

As a result, users are protected against the two most common methods to obtain users passwords, keyloggers or any other malware installed on the device, and shoulder surfing. In both cases, the attacker will think the sensitive information includes the dummy characters typed, while the intended recipient will understand the actual sensitive information. This mechanism also extends the entropy of the sensitive information because the sensitive information does not have a fixed length. Even if the backend system is expecting, for example, a fixed length password, the present invention adds a random number of additional characters that are later removed, thereby concealing the actual length of the sensitive information. A more detailed example use case is illustrated in FIG. 2A and FIG. 2B below.

This invention can be implemented as a security measure either locally or remotely. The local embodiment is an easier approach that does not require backend services to operate. This embodiment will protect against key loggers, shoulder surfing, malware embedded in virtual keyboards, and bad software/driver implementation. In the local embodiment, the user makes an access request. In this part of the process, the user is required to input sensitive data like a credit card number or a password. The user initiates an operation that involves the input of sensitive data.

In an embodiment, when the user is prompted for sensitive data, the system explains the logic that will be used for the input. For example, in the case of a device capable of haptic feedback, e.g., smart phone, tablet, etc., the system will inform the user that every time the user receives a vibration the next input will be ignored. In another embodiment, the system can also use sound feedback. In this embodiment, the system will explain to the user that this process requires private audio source, e.g., ear buds or headphones, and every time the user hears a beep the next input will be ignored.

In an embodiment, the user inputs the sensitive data with the protection mechanism. In this embodiment, the user starts typing sensitive data, and as each character is input, the invention determines if the next character will be ignored. In an embodiment, if the input data has a fixed size, then the invention determines the total number of characters, including obfuscated ones, to be input. For example, in the case of a six-digit pin the device may request eight digits. In other embodiments, the invention will determine the random characters as the user is typing.

In an embodiment, the invention uses non-visual capabilities to notify the user that the next character typed will be ignored. In response, the user knowingly types a random character. The system in the background ignores the character but visually proceeds as normal. In this way potential shoulder surfers or keyloggers will grab a normal, but spoofed, sensitive data. The user finishes typing sensitive data. In the case of a fixed sized password, the invention automatically detects the completion; otherwise, the user will confirm the completion, for example, by pressing the enter key or a special character. The device uses the input information in the background with the spoofed characters removed. The local embodiment is further explained in FIG. 3 below.

In the remote embodiment, the user makes an access request. In this part of the process, the user is required to input sensitive data like a credit card number or a password. The user initiates an operation that involves the input of sensitive data.

In an embodiment, when the user is prompted for sensitive data, the system explains the logic that will be used for the input. For example: In the case of a device capable of haptic feedback, e.g., smart phone, tablet, etc.), the system will inform the user that every time the user receives a vibration the next input will be ignored. In another embodiment, the system can also use sound feedback. In this embodiment, the system will explain to the user that this process requires private audio source, e.g., ear buds or headphones, and every time the user hears a beep the next input will be ignored.

In an embodiment, the user inputs the sensitive data with the protection mechanism. In this embodiment, the user starts typing sensitive data, and the device generates an OTP. The invention uses the OTP to determine the positions of dummy characters to be ignored. In an embodiment, as each character is input, the invention determines if the next character will be ignored based on the OTP. In an embodiment, if the input data has a fixed size, then the invention determines the total number of characters, including obfuscated ones, to be input. For example, in case of a six-digit pin the device may request eight digits. In other embodiments, the invention will determine the random characters as the user is typing.

In an embodiment, the invention uses non-visual capabilities to notify the user that the next character typed will be ignored. In response, the user knowingly types a random character. The system in the background ignores the character but visually proceeds as normal. In this way potential shoulder surfers or keyloggers will grab a normal, but spoofed, sensitive data. The user finishes typing sensitive data. In the case of a fixed sized password, the invention automatically detects the completion; otherwise, the user will confirm the completion, for example, by pressing the enter key or a special character.

In this embodiment, the entire obfuscated sensitive information is sent to the backend system. The backend system uses the identification of the user, e.g., a user ID, to calculate the OTP that matches the OTP of the user. The invention then uses the OTP to calculate the positions of the dummy characters, extracts the dummy characters from the obfuscated sensitive information, and recovers the actual sensitive information. In this embodiment, since the entire obfuscated sensitive information is sent to the backend system, the present invention protects against MitM attacks, since even an attacker intercepting the communications between the user and the backend system will receive the spoofed, obfuscated sensitive information.

This embodiment will also protect against a brute force attack. A brute force attack is a type of attack where the hacker uses a script or a program that will try all possible combinations of characters until the attacker finds the correct password. Since the remote embodiment of the present invention will ignore certain characters based on the OTP, which is dynamic, a brute force attack is useless since it random characters will always be ignored. The remote version is explained in FIGS. 4 and 5 below.

Additionally, the present invention is a great source of threat intelligence because it can detect login attempts made with the "fake credentials," which are then used to determine a possible sensitive data exfiltration and detect other attack vectors like malware, keyloggers, or sniffers present on the system or the network. For example, when an attacker uses sensitive data stolen during a shoulder surfing attack, the system can look back in its logs for a time stamp and user information to determine when and where that fake sensitive data was generated. This allows system administrators and security personnel to track back and determine the source of the attempted breach. In the case of a MitM attack, for example, this could allow the system administrators to locate and remove malware on the system.

FIG. 1 is a functional block diagram illustrating a distributed data processing environment, generally designated 100, suitable for operation of input obfuscation program 112 and backend obfuscation program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes user device 110 and computing device 130, both connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between user device 110, computing device 130, and other computing devices (not shown) within distributed data processing environment 100.

User device 110 can be a standalone computing device, a management server, a web server, a mobile computing device, or any other electronic device or computing system capable of receiving, sending, and processing data. In an embodiment, user device 110 can be a smart phone, a tablet computer, a laptop computer, a netbook computer, a personal digital assistant (PDA), or any programmable electronic device capable of communicating with other computing devices (not shown) within distributed data processing environment 100 via network 120.

In an embodiment, user device 110 includes input obfuscation program 112. In an embodiment, input obfuscation program 112 is a program, application, or subprogram of a larger program for obfuscation of sensitive information through non-visual feedback. In an alternative embodiment, input obfuscation program 112 may be located on any other device accessible by user device 110 via network 120.

In an embodiment, user device 110 includes information repository 114. In an embodiment, information repository 114 may be managed by input obfuscation program 112. In an alternate embodiment, information repository 114 may be managed by the operating system of the device, alone, or together with, input obfuscation program 112. Information repository 114 is a data repository that can store, gather, compare, and/or combine information. In some embodiments, information repository 114 is located externally to user device 110 and accessed through a communication network, such as network 120. In some embodiments, information repository 114 is stored on user device 110. In some embodiments, information repository 114 may reside on another computing device (not shown), provided that information repository 114 is accessible by user device 110. Information repository 114 includes, but is not limited to, time stamp data, event data, security data, OTP data, user data, and other data that is received by input obfuscation program 112 from one or more sources, and data that is created by input obfuscation program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

In some embodiments, user device 110 includes OTP Service 116. OTP service 116 may be a program or device that can generate one-time passwords that are used to determine which characters to obfuscate through non-visual feedback. In an embodiment, OTP service 116 may be unique to the present invention. In another embodiment, OTP service 116 may be an existing OTP service, which allows the present invention to work with pre-existing systems.

Computing device 130 can be a standalone computing device, a management server, a web server, a mobile computing device, or any other electronic device or computing system capable of receiving, sending, and processing data. In an embodiment, computing device 130 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 130 can represent a server computing system utilizing multiple computers as a server system, such as in a cloud computing environment. In yet another embodiment, computing device 130 represents a computing system utilizing clustered computers and components (e.g., database server computers, application server computers, etc.) that act as a single pool of seamless resources when accessed within distributed data processing environment 100.

In an embodiment, computing device 130 includes backend obfuscation program 132. In an embodiment, backend obfuscation program 132 is a program, application, or subprogram of a larger program for obfuscation of sensitive information through non-visual feedback. In an alternative embodiment, backend obfuscation program 132 may be located on any other device accessible by computing device 130 via network 120.

In an embodiment, computing device 130 includes information repository 134. In an embodiment, information repository 134 may be managed by backend obfuscation program 132. In an alternate embodiment, information repository 134 may be managed by the operating system of the device, alone, or together with, backend obfuscation program 132. Information repository 134 is a data repository that can store, gather, compare, and/or combine information. In some embodiments, information repository 134 is located externally to computing device 130 and accessed through a communication network, such as network 120. In some embodiments, information repository 134 is stored on computing device 130. In some embodiments, information repository 134 may reside on another computing device (not shown), provided that information repository 134 is accessible by computing device 130. Information repository 134 includes, but is not limited to, time stamp data, event data, security data, OTP data, user data, and other data that is received by backend obfuscation program 132 from one or more sources, and data that is created by backend obfuscation program 132.

Information repository 134 may be implemented using any volatile or non-volatile storage media for storing information, as known in the art. For example, information repository 134 may be implemented with a tape library, optical library, one or more independent hard disk drives, multiple hard disk drives in a redundant array of independent disks (RAID), solid-state drives (SSD), or random-access memory (RAM). Similarly, information repository 134 may be implemented with any suitable storage architecture known in the art, such as a relational database, an object-oriented database, or one or more tables. In some embodiments, information repository 114 and information repository 134 may be the same repository.

In some embodiments, computing device 130 includes OTP Service 136. OTP Service 136 may be a program or device that can generate one-time passwords that are used to determine which characters to obfuscate through non-visual feedback. In an embodiment, OTP service 136 may be unique to the present invention. In another embodiment, OTP service 136 may be an existing OTP service, which allows the present invention to work with pre-existing systems.

In an embodiment, OTP service 136 is the same as OTP service 116 from user device 110. In another embodiment, OTP service 136 is similar to, but not the same as, OTP Service 116. In an embodiment, OTP service 136 is used to validate the OTP generated by 116. For example, the system may use a TOTP (Time-based OTP) that refreshes every minute, then OTP service 136 will generate 2 OTPs (based on the actual time, and the last-minute time). This allows the system to be flexible. In some embodiments, OTP service 136 and OTP service 116 are not the same service but work in harmony after enrollment.

FIG. 2A and FIG. 2B are a web sequence diagram, generally designated 200, illustrating an example of a user sending sensitive information, in this example a password, to a backend system, in accordance with an embodiment of the present invention. In the example of FIG. 2A and FIG. 2B, User 202 using, for example, user device 110 from FIG. 1, is sending sensitive information to Backend System 206, e.g., computing device 130 from FIG. 1. In the example illustrated in FIG. 2A and FIG. 2B, Attacker 204 is spying on user 202. Attacker 204 may be, for example, a person "shoulder surfing," i.e., looking over the shoulder of user 202 to capture the password. In another example, attacker 204 is malware, e.g., a virtual keyboard app that is capturing the keystrokes of User 202 for a man-in-the-middle (MitM) attack.

In the example of FIG. 2A and FIG. 2B, the present invention uses non-visual feedback by vibrating the user device to signal the user that the next character typed is a dummy character that will be ignored by the invention.

In the example of FIG. 2A and FIG. 2B, user 202 wants to log into a service on backend system 206, so in Step 210 user 202 types in the first character of the actual password, the character "A". It should be noted that even though the character "A" is the first character of the actual password, the invention might have vibrated to prompt user 202 to type a dummy character instead of the valid character for the first character entered.

In Step 212, attacker 204 records the character "A." In Step 214, the present invention sends a non-visual feedback to user 202 by vibrating the user device. This non-visual feedback alerts user 202 that the next character typed will be ignored, so in Step 216 user 202 types a dummy character, "Z" in this example. Attacker 204 sees the character "Z", and in Step 218 records the character "Z" as the next character in the stolen password. The invention, however, knows this is a dummy character and therefore in Step 220 backend system 206 ignores the character "Z."

Since the device does not vibrate after typing the character "Z" as noted in Step 222, user 202 knows the next character typed must be the actual next character of the password, and therefore in Step 224 types the character "B".

Attacker 204 records the character "B" in step 226. Again, the device does not vibrate, as noted in Step 228, and therefore in Step 230 user 202 types the next actual character of the password, "1." Again attacker 204 records the character "1" in Step 232, but after this character the device again vibrates, as noted in Step 234. In response to the non-visual feedback, user 202 types dummy character "X" in Step 236. Since attacker 204 does not know this is a dummy character, attacker 204 records the character "X" in the stolen password in Step 238. In Step 240, backend system 206, however, ignores character "X."

In Step 242 it is noted that the device does not vibrate after the character "X" is typed, and therefore in Step 244 user 202 types the last actual character of the password, "2." In Step 246 this character is recorded by attacker 204, and, as indicated by Step 248, the device does not vibrate. It should be noted that even though the character "2" is the last character of the actual password, the invention might still vibrate to prompt user 202 to type additional dummy characters.

Since user 202 has now completed the password entry, user 202 requests authorization from backend system 206 in Step 250. Attacker 204 now knows that the password entry is complete, however, attacker 204 has recorded the password as "AZB1X2" in Step 252, while Step 254 shows that the actual password is "AB12."

Figure 3:
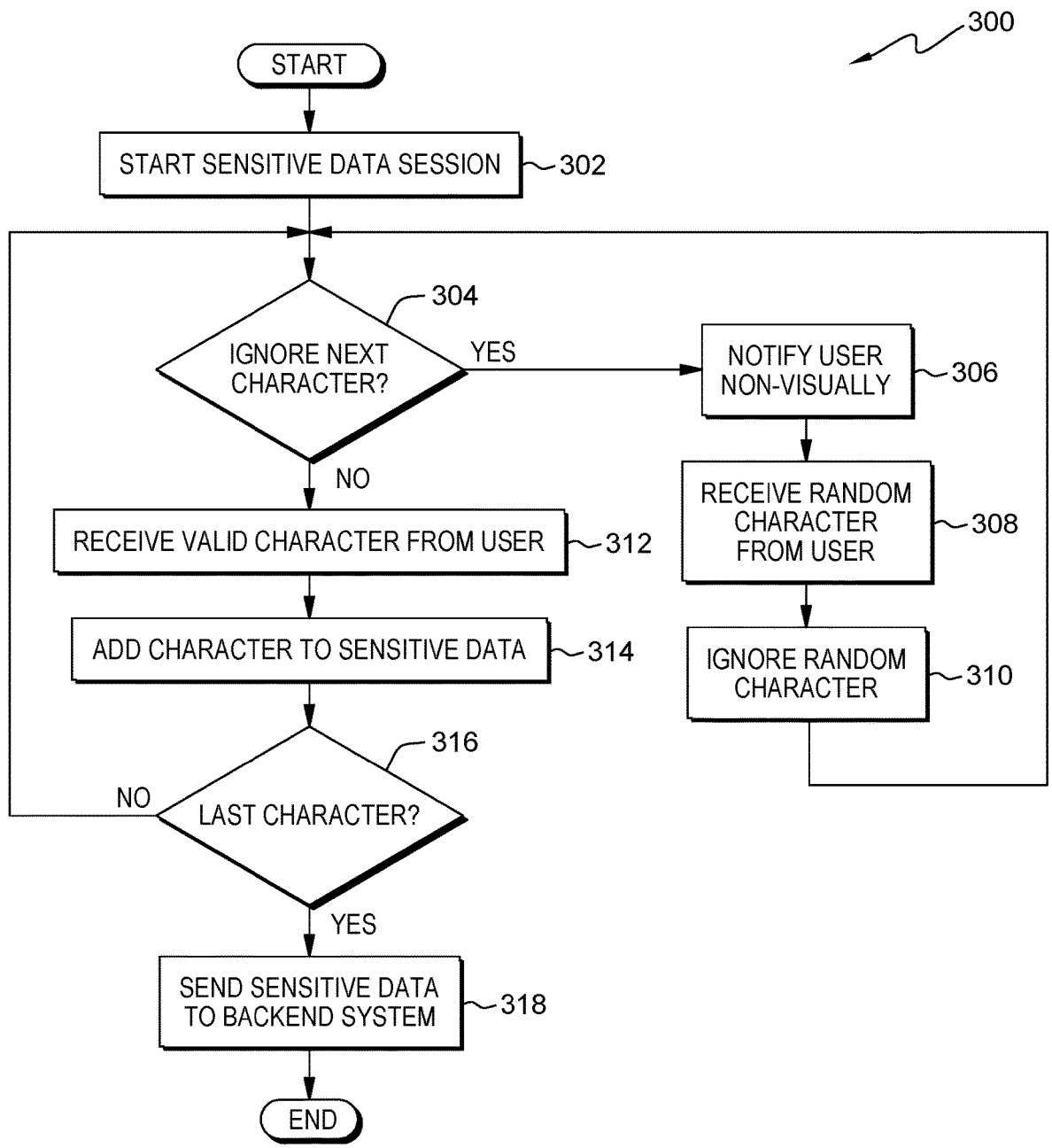
FIG. 3 is a flowchart depicting operational steps of the input obfuscation program, on a computing device within the distributed data processing environment of FIG. 1, for obfuscation of sensitive information through non-visual feedback, in accordance with an embodiment of the present invention.

FIG. 3 is a flowchart depicting operational steps of input obfuscation program 112, on a computing device within the distributed data processing environment of FIG. 1, for obfuscation of sensitive information through non-visual feedback, in accordance with an embodiment of the present invention. In an alternative embodiment, the steps of workflow 300 may be performed by any other program while working with input obfuscation program 112. The embodiment of FIG. 3 represents the simple case of input obfuscation program 112 running on a user device. In this embodiment, the backend system is not aware of the present invention, and therefore no modifications are required to existing systems to use the invention. In this embodiment, all steps are performed on the user device, e.g., user device 110 of FIG. 1. In this embodiment, once input obfuscation program 112 has input all the sensitive information, e.g., a password, then input obfuscation program 112 sends the unobfuscated sensitive information to the backend system.

In an alternative embodiment, the steps of workflow 300 may be performed by any other program while working with input obfuscation program 112. It should be appreciated that embodiments of the present invention provide at least for obfuscation of sensitive information through non-visual feedback. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 3 illustrates one possible iteration of the operational steps performed by input obfuscation program 112 for obfuscation of sensitive information through non-visual feedback, which repeats each time a user inputs sensitive information.

In an embodiment, input obfuscation program 112 receives a signal from a user that the user wants to send sensitive information to a backend system. In an embodiment, input obfuscation program 112 determines if the next character should be ignored, i.e., the user should type a dummy character. In an embodiment, if input obfuscation program 112 determines that the next character should be ignored, then input obfuscation program 112 notifies the user that the next character typed will be ignored using non-visual feedback. In an embodiment, input obfuscation program 112 receives the random character typed in by the user. In an embodiment, since input obfuscation program 112 knows that the typed character is a dummy character, input obfuscation program 112 ignores the random character. In an embodiment, since input obfuscation program 112 determined that the next character should not be ignored in decision block 304, then the next character is an actual character of the sensitive information, and therefore input obfuscation program 112 does not ignore the character. In an embodiment, input obfuscation program 112 adds the character to the sensitive data to be sent to the backend system. In an embodiment, input obfuscation program 112 determines if the typed character is the last character of the sensitive information. In an embodiment, once input obfuscation program 112 determines that the sensitive information input is complete, input obfuscation program 112 sends the sensitive information to the backend system recipient.

Input obfuscation program 112 starts a sensitive data session (step 302). In an embodiment, input obfuscation program 112 receives a signal from a user that the user wants to send sensitive information to a backend system. In an embodiment, the signal may be the user starting a sensitive information obfuscation app on a user device, e.g., user device 110 from FIG. 1. In another embodiment, input obfuscation program 112 may monitor the user device to detect that the user is about to enter sensitive information by, for example, detecting a login screen on a window on the user device, and prompting the user to obfuscate the sensitive information. In yet another embodiment, the signal may be any appropriate means as would be known to a person of skill in the art.

Input obfuscation program 112 determines if the next character should be ignored (decision block 304). In an embodiment, input obfuscation program 112 determines if the next character should be ignored, i.e., the user should type a dummy character. In an embodiment, if input obfuscation program 112 determines the next character should be ignored ("yes" branch, decision block 304), then input obfuscation program 112 proceeds to step 306 to notify the user non-visually. In an embodiment, if input obfuscation program 112 determines that the next character should not be ignored ("no" branch, decision block 304), then then input obfuscation program 112 proceeds to step 312 to receive the character.

In an embodiment, input obfuscation program 112 determines if the next character should be ignored by generating a random number to define the positions of the dummy characters. In one example, input obfuscation program 112 may generate up to 4 dummy characters to obfuscate a 7 character sensitive data using a random algorithm, e.g., a random number generator, to generate a 4 digit number, with each digit between 0 and 7. Once the random number has been generated, each digit represents one position to be obfuscated. Some examples of the generated number and its interpretation are 5234, which means obfuscate the character in positions 2, 3, 4 and 5; 5001, which means obfuscate the character in positions 1 and 5; and 5535, which means obfuscate the character in positions 3 and 5. When a number is repeated, it will be applied only once. This allows for an obfuscated sensitive data of dynamic size (i.e., a variable number of dummy characters).

Input obfuscation program 112 notifies the user non-visually (step 306). In an embodiment, if input obfuscation program 112 determines that the next character should be ignored, then input obfuscation program 112 notifies the user that the next character typed will be ignored using non-visual feedback. In an embodiment, input obfuscation program 112 notifies the user by vibrating the user device. In another embodiment, input obfuscation program 112 notifies the user by an audio signal. In yet another embodiment, input obfuscation program 112 notifies the user by vibration through IoT devices, e.g., a connected keychain; electrical stimulation; and other user machine interfaces, e.g., a neural link. In yet another embodiment, input obfuscation program 112 notifies the user by any non-visual means that would be difficult or impossible for an attacker to intercept, as would be known to a person of skill in the art.

Input obfuscation program 112 receives a random character from the user (step 308). In an embodiment, input obfuscation program 112 receives the random character typed in by the user.

In an embodiment, to teach the user good practices, when a user is requested to type an obfuscation character and the user retypes the same character or the next character of the sensitive data, then input obfuscation program 112 will ask for an additional obfuscation character. For example, if the sensitive data is ABCD and the device vibrates in the letter B, if the user retypes B (the same character), or types C (the next character in the actual password), then input obfuscation program 112 will prompt the user to type additional obfuscation characters until the user types a character that is not the same character and is not the next expected character.

Input obfuscation program 112 ignores the random character (step 310). In an embodiment, since input obfuscation program 112 knows that the typed character is a dummy character, input obfuscation program 112 ignores the random character. In an embodiment, input obfuscation program 112 then returns to decision block 304 to determine if the next character should be ignored.

Input obfuscation program 112 receives a valid character from the user (step 312). In an embodiment, since input obfuscation program 112 determined that the next character should not be ignored in decision block 304, then the next character is an actual character of the sensitive information, and therefore input obfuscation program 112 does not ignore the character.

Input obfuscation program 112 adds the character to the sensitive data (step 314). In an embodiment, input obfuscation program 112 adds the character to the sensitive data to be sent to the backend system.

Input obfuscation program 112 determines if the typed character is the last character (decision block 316). In an embodiment, input obfuscation program 112 determines if the typed character is the last character of the sensitive information. In an embodiment, input obfuscation program 112 determines that the typed character is the last character of the sensitive information by receiving a signal from the user. For example, the user may type a special character that denotes the end of the entry, or the user may enter a specific command such as "login." In an embodiment, input obfuscation program 112 determines that the typed character is the last character of the sensitive information when a fixed size input data is specified, and the specified number of actual characters has been received. In an embodiment, if input obfuscation program 112 determines that the typed character is the last character of the sensitive information ("yes" branch, decision block 316), then input obfuscation program 112 proceeds to step 318 to send the sensitive information. In an embodiment, if input obfuscation program 112 determines that the typed character is not the last character of the sensitive information ("no" branch, decision block 316), then input obfuscation program 112 returns to decision block 304 to determine if the next character should be ignored.

Input obfuscation program 112 sends the sensitive data to the backend system (step 318). In an embodiment, once input obfuscation program 112 determines that the sensitive information input is complete, input obfuscation program 112 sends the unobfuscated sensitive information to the backend system recipient.

Figure 4:
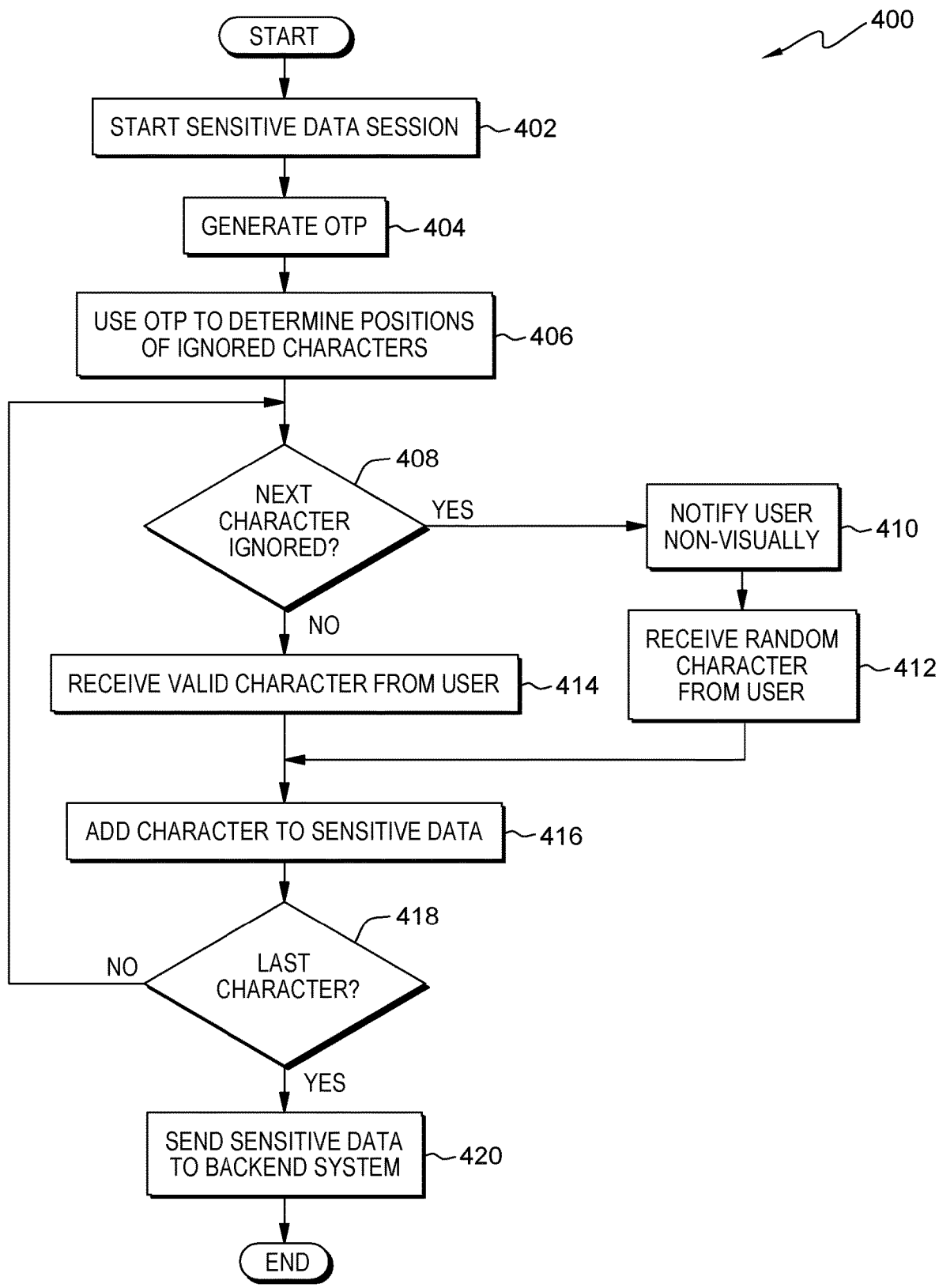
FIG. 4 is a flowchart depicting operational steps of the input obfuscation program, on a computing device within the distributed data processing environment of FIG. 1, for obfuscation of sensitive information through non-visual feedback, in accordance with an alternate embodiment of the present invention.
Figure 5:
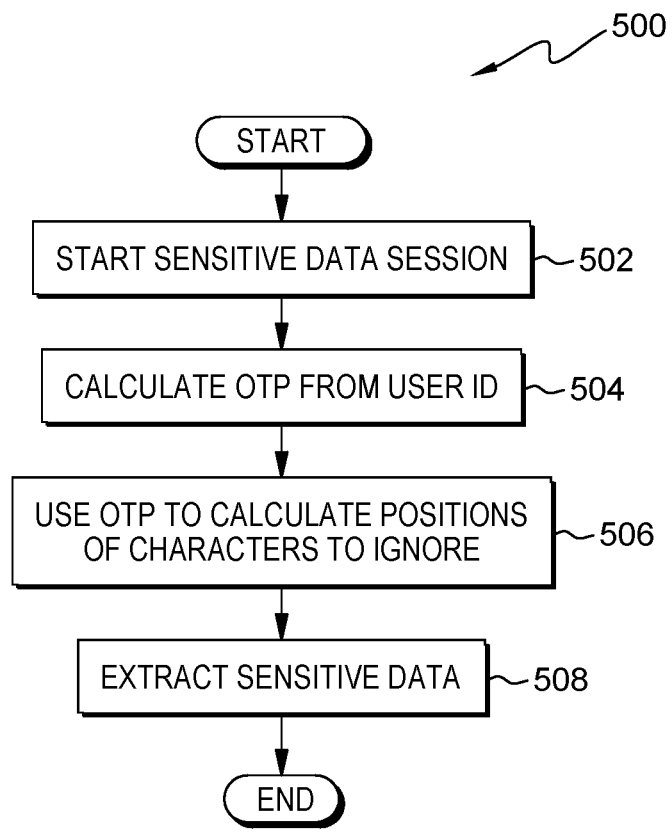
FIG. 5 is a flowchart depicting operational steps of the backend obfuscation program, on a computing device within the distributed data processing environment of FIG. 1, for obfuscation of sensitive information through non-visual feedback, in accordance with an embodiment of the present invention.

FIG. 4 is a flowchart depicting operational steps of input obfuscation program 112, on a computing device within the distributed data processing environment of FIG. 1, for obfuscation of sensitive information through non-visual feedback, in accordance with an alternate embodiment of the present invention. The embodiment of FIG. 4 represents the preferred case of input obfuscation program 112 running on a user device, e.g., user device 110 from FIG. 1, along with an accompanying program running on the backend system, e.g., computing device 130 from FIG. 1. In this embodiment, the backend system is aware of the present invention. All the steps of FIG. 4 are performed on the user device. In this embodiment, once input obfuscation program 112 has input all the sensitive information, e.g., a password, then input obfuscation program 112 sends the full obfuscated input value string, including the dummy characters, to the backend system. The steps for the backend system are shown in FIG. 5 below.

In an alternative embodiment, the steps of workflow 400 may be performed by any other program while working with input obfuscation program 112. It should be appreciated that embodiments of the present invention provide at least for obfuscation of sensitive information through non-visual feedback. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, input obfuscation program 112 receives a signal from a user that the user wants to send sensitive information to a backend system. In an embodiment, input obfuscation program 112 generates an OTP to be used to determine which character positions should be ignored. In an embodiment, input obfuscation program 112 uses the OTP generated in step 404 to determine the character positions that should be ignored. In an embodiment, input obfuscation program 112 determines the next character is ignored based on the analysis of the OTP in step 406. In an embodiment, input obfuscation program 112 notifies the user that the next character typed will be ignored using non-visual feedback. In an embodiment, although input obfuscation program 112 knows that the next character typed by the user is a dummy character, input obfuscation program 112 receives the dummy character. In an embodiment, input obfuscation program 112 receives a valid character from the user. In an embodiment, input obfuscation program 112 adds the character to the sensitive data to be sent to the backend system. In an embodiment, input obfuscation program 112 determines if the typed character is the last character of the sensitive information. In an embodiment, once input obfuscation program 112 determines that the sensitive information input is complete, input obfuscation program 112 sends the obfuscated sensitive information to the backend system recipient.

It should be appreciated that the process depicted in FIG. 4 illustrates one possible iteration of the operational steps performed by input obfuscation program 112 for obfuscation of sensitive information through non-visual feedback, which repeats each time a user inputs sensitive information.

Input obfuscation program 112 starts a sensitive data session (step 402). In an embodiment, input obfuscation program 112 receives a signal from a user that the user wants to send sensitive information to a backend system. In an embodiment, the signal may be the user starting a sensitive information obfuscation app on a user device, e.g., a smart phone. In another embodiment, input obfuscation program 112 may monitor the user device to detect that the user is about to enter sensitive information by, for example, detecting a login screen on a browser window on the user device, and prompting the user to obfuscate the sensitive information. In yet another embodiment, the signal may be any appropriate means as would be known to a person of skill in the art.

Input obfuscation program 112 generates a One-time Password (OTP) (step 404). In an embodiment, input obfuscation program 112 generates an OTP to be used to determine which character positions should be ignored.

In an embodiment, input obfuscation program 112 determines if the next character should be ignored by generating an OTP to define the position of the dummy characters. In one example, input obfuscation program 112 will generate an OTP and use the first 4 valid digits (e.g., between 0 and 7 for an 8 character fixed size sensitive data) to define the obfuscated characters.

Input obfuscation program 112 uses the OTP to determine the positions of the ignored characters. (step 406). In an embodiment, input obfuscation program 112 uses the OTP generated in step 404 to determine the character positions that should be ignored.

In one example, input obfuscation program 112 generates a 6-digit OTP for the example 8 character sensitive data as mentioned above. Some examples of the generated number and its interpretation follow. If input obfuscation program 112 generates an OTP of 523452, then the first 4 valid characters are 5234, which means obfuscate the character in positions 2, 3, 4 and 5. If input obfuscation program 112 generates an OTP of 985234, then the first 4 valid characters are also 5234, since the sensitive data is only 8 characters in this example, so the values 9 and 8 are invalid character positions (positions 0-7 are valid), which means obfuscate the character in positions 2, 3, 4 and 5. If input obfuscation program 112 generates an OTP of 958011, then the first 4 valid characters are 5011, which means obfuscate the character in positions 1 and 5, since when a number is repeated, it will be applied only once. This allows for an obfuscated sensitive data of dynamic size (i.e., a variable number of dummy characters).

Input obfuscation program 112 determines if the next character is ignored (decision block 408). In an embodiment, input obfuscation program 112 determines whether the next character is ignored based on the analysis of the OTP in step 406. In an embodiment, if input obfuscation program 112 determines that the next character is ignored ("yes" branch, decision block 408), then input obfuscation program 112 proceeds to step 410 to notify the user non-visually. In an embodiment, if input obfuscation program 112 determines that the next character is not ignored ("no" branch, decision block 408), then input obfuscation program 112 proceeds to step 414 to receive the character.

Input obfuscation program 112 notifies the user non-visually (step 410). In an embodiment, input obfuscation program 112 notifies the user that the next character typed will be ignored using non-visual feedback. In an embodiment, input obfuscation program 112 notifies the user by vibrating the user device. In another embodiment, input obfuscation program 112 notifies the user by an audio signal. In yet another embodiment, input obfuscation program 112 notifies the user by any non-visual means that would be difficult or impossible for an attacker to intercept, as would be known to a person of skill in the art.

Input obfuscation program 112 receives a random character from the user (step 412). In an embodiment, although input obfuscation program 112 knows that the next character typed by the user is a dummy character, input obfuscation program 112 receives the dummy character. In an embodiment, all characters are sent to the backend system, which determines from the OTP which characters are genuine and which are dummy characters.

In an embodiment, as in step 308 from FIG. 3 above, to teach the user good practices, when a user is requested to type an obfuscation character and the user retypes the same character or the next character of the sensitive data, then input obfuscation program 112 will ask for an additional obfuscation character. For example, if a user sensitive data is ABCD and the device vibrates in the letter B, if the user retypes B (the same character), or types C (the next character in the actual password), then input obfuscation program 112 will prompt the user to type additional obfuscation characters until the user types a character that is not the same character and is not the next expected character. In an embodiment, input obfuscation program 112 then proceeds to step 416.

Input obfuscation program 112 receives a valid character from the user (step 414). In this embodiment, all characters are received by input obfuscation program 112 and added to the input value string.

Input obfuscation program 112 adds the character to the sensitive data (step 416). In an embodiment, input obfuscation program 112 adds the next input character to an input value string of the sensitive data to be sent to the backend system. In this embodiment, all characters typed by the user are sent to the backend system, whether a valid character received in step 414, or a dummy character received in step 412.

Input obfuscation program 112 determines if the typed character is the last character (decision block 418). In an embodiment, input obfuscation program 112 determines if the typed character is the last character of the sensitive information. In an embodiment, input obfuscation program 112 determines that the typed character is the last character of the sensitive information by receiving a signal from the user. For example, the user may type a special character that denotes the end of the entry, or the user may enter a specific command such as "login." In an embodiment, input obfuscation program 112 determines that the typed character is the last character of the sensitive information when a fixed size input data is specified, and the specified number of actual characters has been received. In an embodiment, if input obfuscation program 112 determines that the typed character is the last character of the sensitive information ("yes" branch, decision block 418), then input obfuscation program 112 proceeds to step 420 to send the sensitive information. In an embodiment, if input obfuscation program 112 determines that the typed character is not the last character of the sensitive information ("no" branch, decision block 418), then input obfuscation program 112 returns to decision block 408 to determine if the next character should be ignored.

Input obfuscation program 112 sends the sensitive data to the backend system (step 420). In an embodiment, once input obfuscation program 112 determines that the sensitive information input is complete, input obfuscation program 112 sends the input value string, i.e., the obfuscated sensitive information, to the backend system recipient.

FIG. 5 is a flowchart depicting operational steps of backend obfuscation program 132, on a computing device within the distributed data processing environment of FIG. 1, for obfuscation of sensitive information through non-visual feedback, in accordance with an embodiment of the present invention. The embodiment of FIG. 5 represents the preferred case of backend obfuscation program 132 running on a backend system, e.g., computing device 130 from FIG. 1, along with an accompanying program running on the user device, e.g., user device 110 from FIG. 1. In this embodiment, the backend system is aware of the present invention. All the steps of FIG. 5 are performed on the backend system. In this embodiment, once input obfuscation program 112 has input all the sensitive information, e.g., a password, then input obfuscation program 112 sends the full obfuscated input value string, including the dummy characters, to backend obfuscation program 132. The steps for the user device are shown in FIG. 4 above.

In an alternative embodiment, the steps of workflow 500 may be performed by any other program while working with backend obfuscation program 132. It should be appreciated that embodiments of the present invention provide at least for obfuscation of sensitive information through non-visual feedback. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, backend obfuscation program 132 receives a signal from a user device that the user wants to send sensitive information to a backend system. In an embodiment, backend obfuscation program 132 uses the unique ID of the user to calculate the same OTP that is used by input obfuscation program 112 in FIG. 4. In an embodiment, backend obfuscation program 132 uses the OTP generated in step 504 to determine the positions in the sensitive data that are genuine data and the positions that are dummy characters. In an embodiment, backend obfuscation program 132 scans the sensitive data received from input obfuscation program 112 and, based on the positions of valid data determined in step 506, removes all dummy characters from the sensitive data.

It should be appreciated that the process depicted in FIG. 5 illustrates one possible iteration of the operational steps performed by backend obfuscation program 132 for obfuscation of sensitive information through non-visual feedback, which repeats each time a user inputs sensitive information.

Backend obfuscation program 132 starts a sensitive data session (step 502). In an embodiment, backend obfuscation program 132 receives a signal from a user device that the user wants to send sensitive information to a backend system. In an embodiment, the signal may be an indication that the user started a sensitive information obfuscation app on a user device, e.g., a smart phone. In another embodiment, the signal may be an indication that the user device detected that the user is about to enter sensitive information by, for example, detecting a login screen on a browser window on the user device. In yet another embodiment, the signal may be received by backend obfuscation program 132 using any appropriate means of communication between two devices as would be known to a person of skill in the art.

Backend obfuscation program 132 calculates an OTP from the user ID (step 504). In an embodiment, the user device has pre-enrolled with the backend system to establish a mechanism for using an OTP. In an embodiment, backend obfuscation program 132 uses the unique ID of the user to calculate the same OTP or a group of possible OTPs that is used by input obfuscation program 112 in FIG. 4.

Backend obfuscation program 132 uses the OTP to calculate the positions of characters to ignore (step 506). In an embodiment, backend obfuscation program 132 uses the OTP generated in step 504 to determine the positions in the sensitive data that are genuine data and the positions that are dummy characters. Examples of the use of the OTP to determine the positions that are dummy characters are shown in step 406 from FIG. 4 above.

Backend obfuscation program 132 extracts the sensitive data (step 508). In an embodiment, backend obfuscation program 132 scans the sensitive data received from input obfuscation program 112 and, based on the positions of valid data determined in step 506, and removes all dummy characters from the sensitive data. In an embodiment, the remaining sensitive data represents the unobfuscated sensitive data from the user.

In the embodiment from step 412 from FIG. 4 above, to teach the user good practices, when a user is requested to type an obfuscation character and the user retypes the same character or the next character of the sensitive data, then input obfuscation program 112 will ask for an additional obfuscation character. For example, if a user sensitive data is ABCD and the device vibrates in the letter B, if the user retypes B (the same character), or types C (the next character in the actual password), then input obfuscation program 112 will prompt the user to type additional obfuscation characters until the user types a character that is not the same character and is not the next expected character. In this embodiment, backend obfuscation program 132 detects and deletes the additional characters used to teach the user best practices in step 412 of FIG. 4 above.

Figure 6:
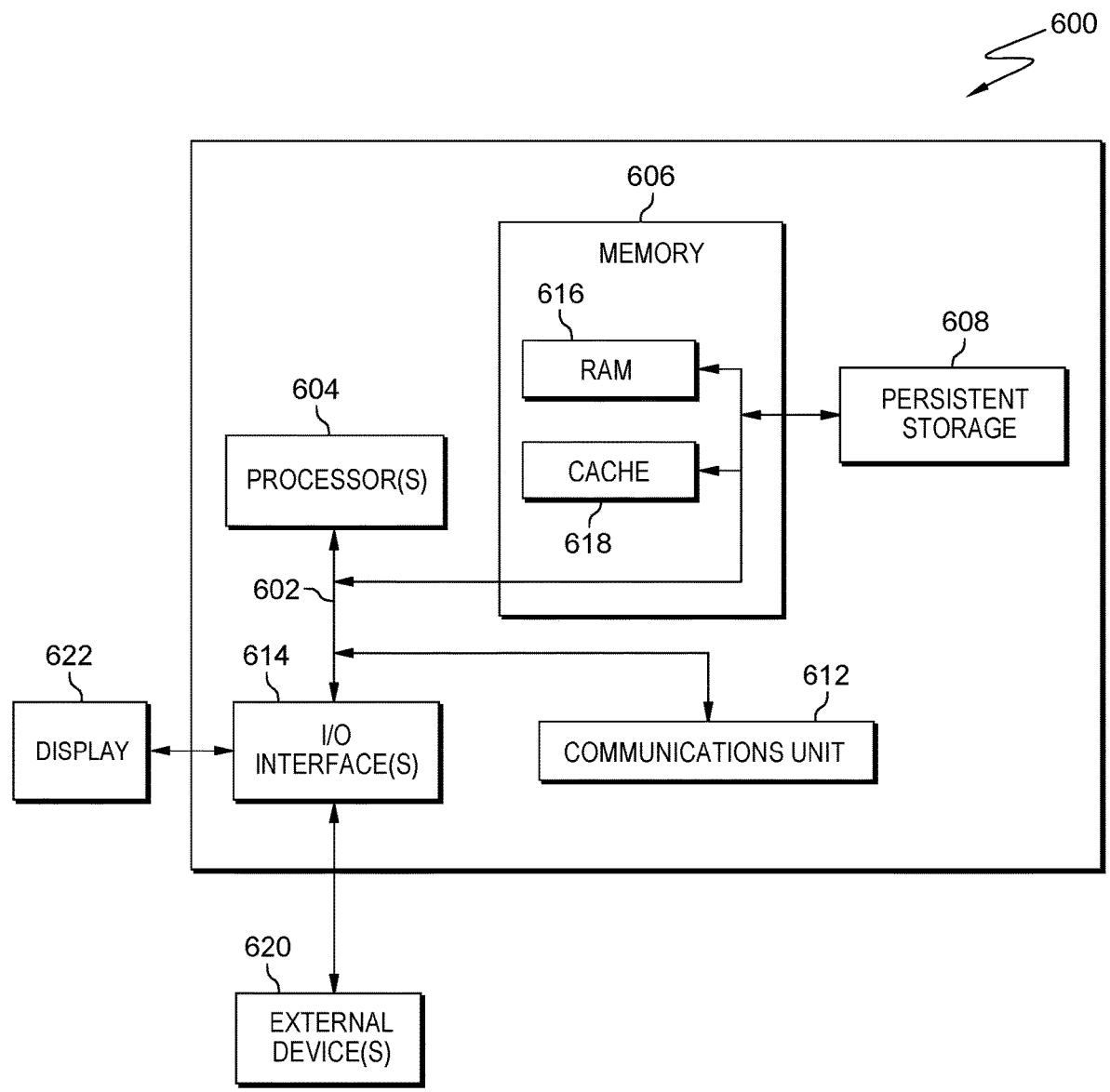
FIG. 6 depicts a block diagram of components of the computing devices executing the input obfuscation program within the distributed data processing environment of FIG. 1, in accordance with an embodiment of the present invention.

FIG. 6 is a block diagram depicting components of user device 110 and computing device 130 suitable for input obfuscation program 112 and backend obfuscation program 132, in accordance with at least one embodiment of the invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for input obfuscation program 112 and backend obfuscation program 132 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600. For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., input obfuscation program 112 and backend obfuscation program 132, can be stored on such portable computer readable storage media and can be loaded onto persistent storage 608 via I/O interface(s) 614. I/O interface(s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to receiving a signal from a user to start a session requiring input of sensitive data, determining, by one or more computer processors, one or more dummy character positions, wherein the one or more dummy character positions represent characters that are not part of the sensitive data;
adding, by the one or more computer processors, input characters received from the user to an input value string;
responsive to determining that a current character position in the input value string is a dummy character position, signaling, by the one or more computer processors, to the user that a next input character will be ignored, wherein the user is signaled using non-visual feedback;
responsive to receiving the next input character from the user, ignoring, by the one or more computer processors, the next input character, wherein ignoring the next input character includes skipping adding the next input character received from the user to the input value string; and
responsive to receiving an indication that a last character has been input by the user, authenticating, by the one or more computer processors, the user based on the input value string.

2. The computer-implemented method of claim 1, wherein the non-visual feedback is at least one of haptic vibration and an audio signal.

3. The computer-implemented method of claim 1 further comprising:
responsive to the next input character from the user being at least one of a same character as a last character input by the user and a next valid character of the sensitive data, ignoring, by the one or more computer processors, the next input character; and
signaling, by the one or more computer processors, the user that the next input character will be ignored, wherein the user is signaled using the non-visual feedback.

4. A computer program product comprising:
one or more computer readable storage media and program instructions stored on the one or more computer readable storage media, the program instructions including instructions to:
responsive to receiving a signal from a user to start a session requiring input of sensitive data, determine one or more dummy character positions, wherein the one or more dummy character positions represent characters that are not part of the sensitive data;
add input characters received from the user to an input value string;
responsive to determining that a current character position in the input value string is a dummy character position, signal to the user that a next input character will be ignored, wherein the user is signaled using non-visual feedback;
responsive to receiving the next input character from the user, ignore the next input character, wherein ignoring the next input character includes skipping adding the next input character received from the user to the input value string; and
responsive to receiving an indication that a last character has been input by the user, authenticate the user based on the input value string.

5. The computer program product of claim 4, wherein the non-visual feedback is at least one of haptic vibration and an audio signal.

6. The computer program product of claim 4 further comprising one or more program instructions, stored on the one or more computer readable storage media, to:
responsive to the next input character from the user being at least one of a same character as a last character input by the user and a next valid character of the sensitive data, ignore the next input character; and
signal the user that the next input character will be ignored, wherein the user is signaled using the non-visual feedback.

7. A computer system comprising:
one or more computer processors;
one or more computer readable storage media; and
program instructions stored on the one or more computer readable storage media for execution by at least one of the one or more computer processors, the stored program instructions including instructions to:
responsive to receiving a signal from a user to start a session requiring input of sensitive data, determine one or more dummy character positions, wherein the one or more dummy character positions represent characters that are not part of the sensitive data;
add input characters received from the user to an input value string;
responsive to determining that a current character position in the input value string is a dummy character position, signal to the user that a next input character will be ignored, wherein the user is signaled using non-visual feedback;
responsive to receiving the next input character from the user, ignore the next input character, wherein ignoring the next input character includes skipping adding the next input character received from the user to the input value string;
responsive to receiving an indication that a last character has been input by the user, authenticate the user based on the input value string.

8. The computer system of claim 7, wherein the non-visual feedback is at least one of haptic vibration and an audio signal.

9. The computer system of claim 7 further comprising one or more program instructions, stored on the one or more computer readable storage media, to:
responsive to the next input character from the user being at least one of a same character as a last character input by the user and a next valid character of the sensitive data, ignore the next input character; and
signal the user that the next input character will be ignored, wherein the user is signaled using the non-visual feedback.

* * * * *